United States Patent
Terbrack

[19]

[11] Patent Number: 5,845,884
[45] Date of Patent: Dec. 8, 1998

[54] ERGONOMIC TOWER SUPPORT DEVICE FOR USING DATA ENTRY SYSTEMS

[76] Inventor: William H. Terbrack, 32121 Fall River Rd., Trabuco Canyon, Calif. 92679

[21] Appl. No.: 677,701

[22] Filed: Jul. 10, 1996

Related U.S. Application Data

[60] Provisional application No. 60/016,187, Apr. 25, 1996.

[51] Int. Cl.⁶ ................................................. B68G 5/00
[52] U.S. Cl. .......................................... 248/118; 248/918
[58] Field of Search ................................... 248/118, 918; 400/715

[56] References Cited

U.S. PATENT DOCUMENTS

| | | | |
|---|---|---|---|
| 4,018,217 | 4/1977 | Evans | 248/118 X |
| 4,973,176 | 11/1990 | Dietrich | 248/118 X |
| 5,005,829 | 4/1991 | Caruso | 272/130 |
| 5,056,743 | 10/1991 | Zwar et al. | 248/118 |
| 5,161,760 | 11/1992 | Terbrack | 248/118 |
| 5,207,791 | 5/1993 | Scherbarth | 248/918 X |
| 5,242,139 | 9/1993 | Aldrich | 248/918 X |
| 5,385,322 | 1/1995 | Kim et al. | 248/118 |
| 5,386,957 | 2/1995 | Miller | 248/918 X |
| 5,398,896 | 3/1995 | Terbrack | 248/118.5 |
| 5,492,298 | 2/1996 | Walker | 248/918 X |
| 5,628,483 | 5/1997 | Smith et al. | 248/118 |

*Primary Examiner*—Peter M. Cuomo
*Assistant Examiner*—Stephen Vu
*Attorney, Agent, or Firm*—John E. Halamka

[57] ABSTRACT

An ergonomic support for portions of the forearm, wrist, palm and hand of a user of data entry devices. The support raises shaped hand cradles to a position whereby the user's fingers and thumbs may access all keys, balls, rollers and switches of the data entry devices while being supported thereby reducing loading on the upper extremities of the operator. The hand cradles are mounted on a tower fixed to a foot pad which are fabricated to slide over the support surface in front of the devices. An optional glide board may be placed under the devices if the support surface inhibits easy sliding of the foot pads. The front edge of the keyboard may be raised to accommodate the toe of the foot pads. A mouse support may be placed under a mouse device to raise the mouse to a height compatible with the keyboard.

6 Claims, 2 Drawing Sheets

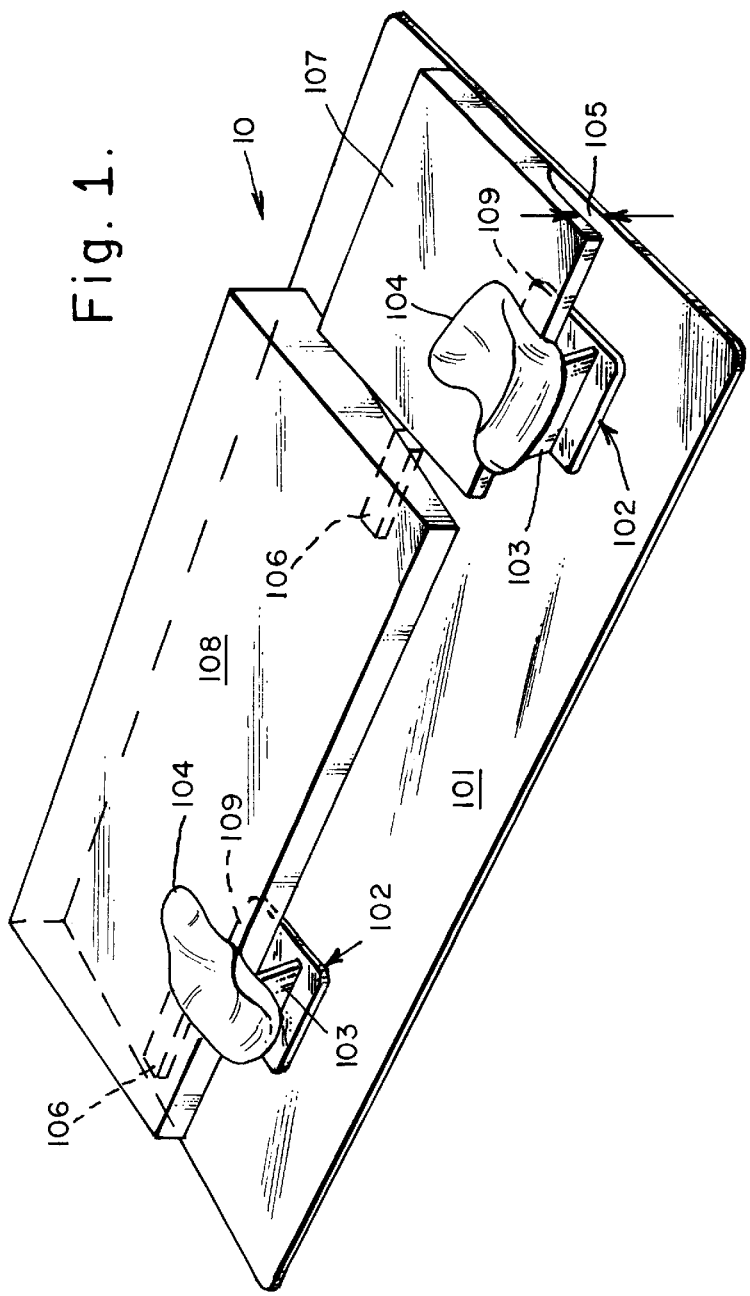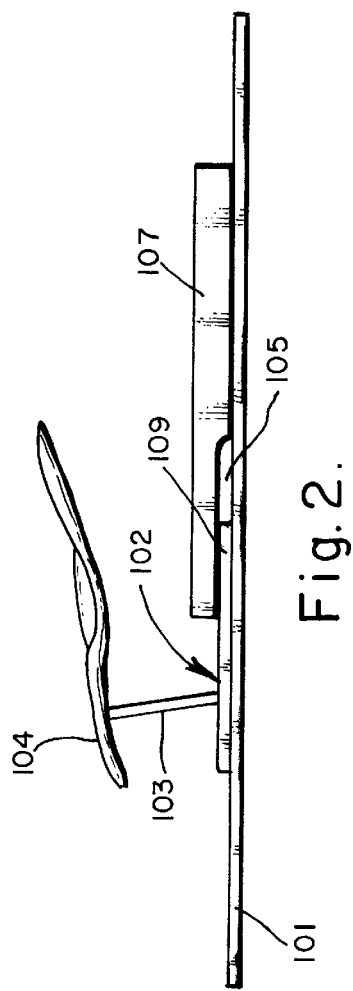

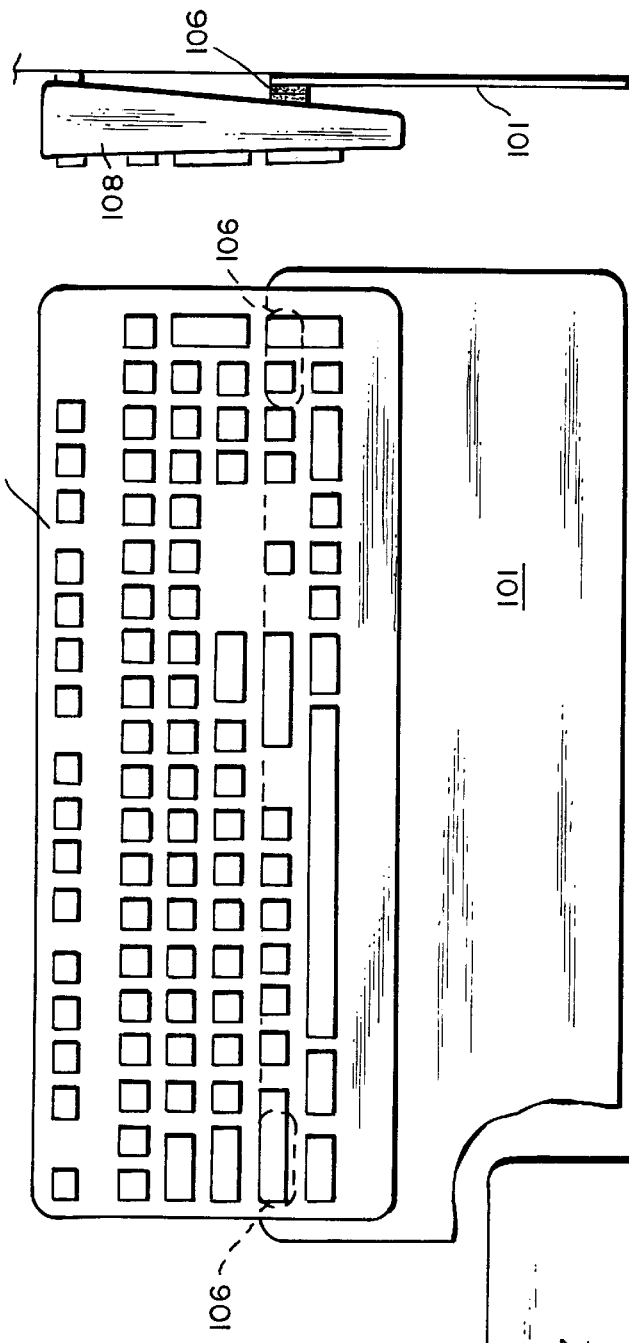
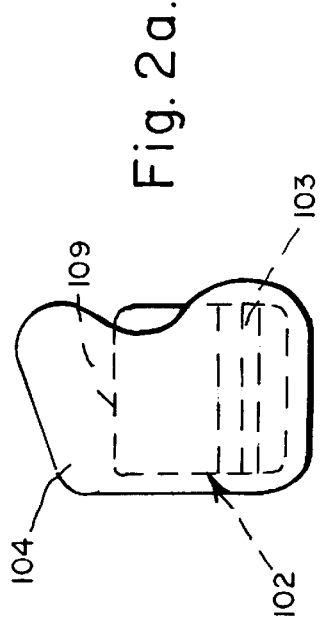
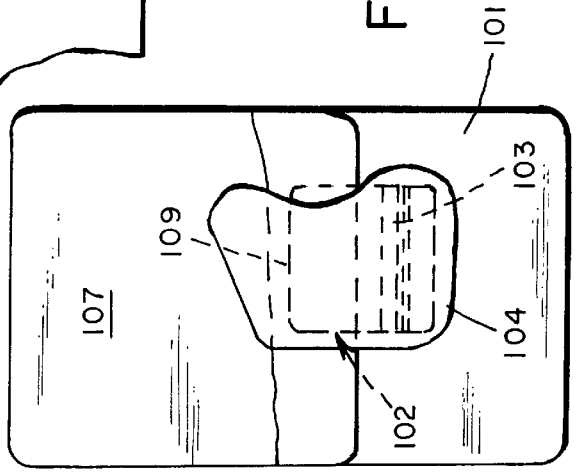

ERGONOMIC TOWER SUPPORT DEVICE FOR USING DATA ENTRY SYSTEMS

TECHNICAL FIELD OF THE INVENTION

The present invention relates generally to the safe use of computer input devices, and more particularly to a device for dynamically supporting portions of the forearms, wrists and hands of an individual during the use of a keyboard and/or a mouse associated with entry of information into a data processing system. This application claims priority of that certain provisional patent filed 25 Apr. 1996 as Ser. No. 60/016187.

BACKGROUND ART

Investigations conducted by the National Institute for Occupational Safety and Health and various world-wide studies have demonstrated elevated occurrences of musculoskeletal discomforts and disorders in operators of data processing system data input devices such as keyboards and the mouse. Statistics from these investigations and studies have shown a correlation between such input device use and shoulder, neck discomfort/pain and wrist tendinitis. However, one of the most serious of the newly emerging disorders revealed from the studies is referred to as repetitive strain injury (RSI) or cumulative trauma disorder. A form of RSI is commonly known as carpel tunnel syndrome.

Researchers have studied methods of preventing occurrences of RSI by providing wrist rests.

Applicant has proposed prior solutions as taught in applicant's U.S. Pat. Nos. 5,161,760 ('760) and 5,398,896 ('896). Both '760 and '896 teach the use of a hand pad sized and configured to support portions of the user's forearm and wrist. Each teach the mounting of the hand pad on movable supports to allow the user to access the entire keyboard. However, with the introduction of extended keyboards, the hand pad supports taught by the '760 and '896 devices may restrict the user's access to the new keys especially if they are mounted on remote edges. Further, the supports may confine the user to utilization of space only close or at least very nearby the front of the keyboard. This makes access to a newly added row of keys at the top of the keyboard and the use of a mouse or trackball device to the side of the keyboard in conjunction with the keyboard cumbersome or impossible without lifting the hand and wrist from the hand pad.

Others have attempted to provide a solution such as taught by Zwar et al. in U.S. Pat. No. 5,056,743 ('743).

'743 teaches a sloped hand board which is positioned coplanar with the keyboard. '743 further teaches forming the hand board with an raised edge at the top and bottom. These edges limit the travel of the hand pads used to support the user's hands. The hand pads taught by '743 have only slightly raised edges which are taught to be sufficient to prevent the hands from sliding off. Keys now available on the new data entry keyboards such as extended key pads and function keys may not be accessible in a supported manner to the user of a device taught by '743 due to the limitation of travel of the hand pads. The combination of the edges of the hand pads and the edges of the hand board may limit the supported travel of the user's hands. Full utilization of an extended keyboard and mouse may require movement such as lifting the hands from the hand pads thereby introducing an action unsupported by the hand pads which may cause injury to the user.

If the hand pads taught by '743 were mounted on slidable towers as taught herein, the hands would slide off of the hand pads rather than push the tower and foot pads beneath the user's hands. The hand pads taught herein conform to and thus caress the user's hands. This increased surface support allows the entire hand pad, tower and foot device to follow the movement of the hands with enough force to push the tower and foot pads to another position under and remain supportive of the hands.

The introduction of APPLE computers and MICROSOFT Windows operating systems for other computers have required the use of a mouse or trackball to realize the most economical and simple data entry operation.

Thus, in addition to the introduction of extended keyboards, the mouse or trackball device have become a standard data entry tool.

However, the stress symptoms in the hands and wrists observed with prolonged keyboard operation are now also experienced by many individuals operating the mouse or trackball.

Any support device must allow the user access beyond the edges of the keyboard.

Thus there has long been a need for an arrangement utilizing a hand support which does not restrict the placement of the user's hands over the entire surface of an extended keyboard and beyond the foot print of the keyboard to allow the user to operate a mouse or trackball device.

It is an object of this invention to add a device to a data entry work station, particularly to the extended keyboard and mouse or trackball, to provide a comfortable support for the lower forearms, wrists, palms and hands of the operator.

It is a further object to provide a contoured, cushioned cradle support for the user of a shape, size and form to allow the user's fingers and thumbs to move freely over the keyboard or mouse controls yet discourage wrist motions and encourage good body posture.

It is desired that the support device allow the user to freely access all keys available even on extended keyboards without lifting the hand from the support.

It is further desired that the support device allow the user to conveniently access auxiliary input devices such as a mouse or trackball without removing the hand from the support.

It is yet further desired that the support glide easily and silently on the surface supports the input driver. If smooth movement is not achievable, an option glide board may be placed on the supporting surface to create a smooth surface, thereby extending the footprint of the keyboard especially if the keyboard is resting on a non-slick surface.

DISCLOSURE OF THE INVENTION

Accordingly, it is an object of the present invention to provide a comfortable support for the user which is easily moved along the front edge of the keyboard and over auxiliary input devices to allow the user to access all keys, balls, rollers, and switches of the devices.

It is another object to provide a configuration without stops which may limit the user's accessibility.

It is yet another object to maintain the alignment of the keyboard and auxiliary device even if the support comes into contact with the input device.

The above and other objects of the present invention are achieved, according to a preferred embodiment thereof, by providing a tower mounted on a reduced friction foot pad and having a hand cradle mounted above the tower for supporting user access to a data input device. The tower may be mounted on a friction reducing foot pad which moves smoothly over the surface on which the keyboard is resting. A glide board may be utilized to provide a compatible, slick surface for the foot pad. The foot pad is formed of a preselected shape to provide a stable support of the hand cradle. The front of the foot pad shape incorporates a toe which may slide under the edge of the input device to allow non-restricted access to even the most remote reaches of an extended keyboard. To accommodate the toe, the edge of the keyboard or mouse support may be fitted with a kick plate formed by slightly raising the front edge with a velcro spacer which also anchors the keyboard and mouse to the glide board in a user desired configuration.

The top surface of the optional glide board may be fabricated of a variety of hard plastics such as ABS or Polycarbonate containing a self-lubricant and the bottom of the foot pad may incorporate a self-lubricating slick material such as TEFLON or NYLON compatible with the glide board to facilitate easy, low friction sliding motions of the combined foot pad, hand cradle and tower device over the glide board.

The present invention incorporates a tower of a preselected length to give the desired height to the hand support whereby the user's hands are comfortably supported above the keyboard. This desired height may vary to accommodate various keyboard designs. The tower may be fabricated to provide a slightly flexible support for the hand cradle which adds to the overall comfort and range of travel of the hand cradle. The tower may also allow some twisting to accomodate slight adjustment of the position of the hand cradle without requiring the movement of the foot pad. The tower is mounted by one end to the foot pad with the other end providing a mounting for the hand cradle. The preferred configuration is for the tower to be mounted toward the rear of the hand cradle and foot pad. The combined foot pad, tower and hand cradle may be formed so that, under the condition of the toe of the foot pad being adjacent to the keyboard or engaged in the kick plate area, the front of the hand cradle may extend over the keyboard or mouse providing the ueser with easy access to all keys, balls, rollers and switches.

A mouse support may be installed next to the keyboard to provide a raised operational level of the mouse consistent with the level of the keyboard. The mouse support may be constructed to provide a kick plate area for the foot pad. The mouse support is simply set on a supportive surface next to the keyboard or the optional glide board may be positioned under both the keyboard and mouse. The front edge of the keyboard and the mouse support may also incorporate velcro anchor pads to create a kick plate area for the toe of the foot pad and to facilitate the establishment of a stable, user selected alignment of the keyboard and mouse support.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which:

FIG. 1 is a perspective view of a group of devices used for data entry having the ergonomic support positioned to support use of the devices;

FIG. 2 is a plane view of the ergonomic support device;

FIG. 2a is a top view of the hand cradle;

FIG. 3 is a plane view of the ergonomic support port for the mouse data input device;

FIG. 4 is a plane view of a keyboard placed on a glide board of the invention; and FIG. 4A is a side view of FIG. 4.

MODES FOR CARRYING OUT THE INVENTION

Referring now to the drawing, FIG. 1 shows the ergonomic computer data entry system, generally designated 10, fabricated according to the teaching of the present invention.

FIG. 1 depicts the glide board 101 which may be used to provide a smooth, slick surface in front of the keyboard 108 and associated auxiliary input device support 107. The glide board 101 is only necessary to use if the data input devices are placed on a surface which does not allow ease of movement of the foot pad 102 over that support surface. Should the underlying support surface allow smooth movement of the ergonomic support;. the glide board 101 may be eliminated from the configuration.

As data entry devices may be simplified, the necessity for a keyboard 108 may diminish. The device taught by the present invention may be used with simplified data entry configurations or if the data entry situation requires only a mouse, that portion relating to a mouse support 107 and hand support (102, 103 and 104) may be all that is required. In this configuration, the necessity for adding a glide board 101 to the configuration will again depend upon the working surface upon which the mouse support 107 rests. The configuration of the mouse support 107 with a kick plate 105 is recommended to provide full access to the mouse while maintaining full support of the user's hand and wrist.

FIG. 2 illustrates the assembled foot pad 102, tower 103 and hand cradle 104 resting on the glide board 101. FIG. 2A illustrates the configuration of the top surface of a right handed hand cradle 104.

Although the basic form, shape and function of the hand cradle 104 is described in U.S. Pat. No. 5,398,896, the method of positioning the hand cradle 104 in front of a keyboard 108 as taught by this invention is entirely different.

With the unique shape of the hand cradle as depicted in FIG. 2, the fingers and thumbs of the operator are completely free to move while the wrists, hands, and palms are fully supported. The wrist and hand support reduces the load on the upper extremities of the operator, (neck shoulder and back) while the palm rest reduces strain in the hands and lower forearms. Additionally, all keys are approximately equidistant to the operators fingers as the hand rests with the supported hands glide easily from point to point.

The hand cradle 104 is mounted on one end of a tower 103 fabricated of flexible material to provide the user with a non-rigid elastic feel of the hand cradle 104. The length of the tower 103 is preselected to allow the device to support the hand of the user above the keyboard 108. In the preferred embodiment, the desired spring-tension is provided if the tower 103 is fabricated of ABS plastic having a thickness of about 0.075 to 0.1 inch. The width of the tower 103 may be selected to allow some twisting of the tower 103 to provide for minor adjustment in the position of the user's hands and hand cradles 104 without requiring the repositioning of the foot pad 102.

The comfort of the user is enhanced if the tower 103 is mounted to the hand cradle 104 toward the rear of the hand cradle 104, right under the user's wrist joint. This allows minor hand flexing at the wrists.

Further, the rearward positioning of the tower 103 allows the entire hand of the user to extend over the keyboard 108 as the toe 109 of the foot pad 102 slips under the front edge of the keyboard 108 or into the space created by the kick plate 105.

The shape of the hand cradle 104 fully supports the user's wrists, hands and palms while allowing complete freedom of movement of the fingers and thumbs of the user. The top surface of the hand cradle 104 may be covered with a soft, cushioning material to enhance the feel and comfort of the device to the user.

The shape of the foot pad 102 is selected to allow the entire tower 103 and hand cradle 104 combination to remain upright and stable during use, movement and especially removal of the user's hands at the end of a data entry session. The bottom surface of the foot pad 102 must be slidable over the surface on which the data entry system is placed or over the optional glide board 101. Best results in slick movement are obtained by using dissimilar plastics in the foot pad 102 and top surface of the glide board 101. For example, if the glide board 101 is ABS plastic, the underside of the foot pad 102 could be TEFLON, NYLON or DELRIN, all of which can contain a self-lubricant.

A mouse support 107 may be added to the data entry system. The configuration shown in FIG. 1 depicts the kick plate 105 of the mouse support 107 formed in the shape of the lower front edge. As the shape of the front edge of keyboards 108 is dictated by the OEM of the keyboard, a kickplate area may be created when the optional glide board 101 is placed under the keyboard 108. As shown in FIG. 4, the glide board 101 may contain velcro anchor 106 areas which function to keep the keyboard 108 in a selected alignment on the glide board 101 and slightly raise the front edge of the keyboard 108 thereby creating a kickplate 105 to accommodate the toe 109 of a foot pad 102. In the preferred embodiment, the height of the mouse support 107 is approximately the same as the keyboard 108 so that the user may transition between input devices. Velcro anchor 106 points may be added to the mouse support 107 and glide board 101 to assist in keeping the mouse support 107 in user selected alignment with the keyboard 108.

The glide board 101 depicted in FIG. 4 as only under the keyboard and the glide board 101 depicted in FIG. 3 as only under the mouse support 107, may be combined into a single glide board 101 depicted in FIG. 1 under both devices.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. An ergonomic support for a user of a data entry work station, said ergonomic support is adapted to be mountable to said work station having at least a keyboard and a mouse device, said ergonomic support comprising, in combination:

a tower, fabricated of a preselected length of semi-rigid material having an upper and lower end;

a foot pad having a toe element and a bottom surface mounted on said lower end of said tower, wherein an edge of said foot pad is adjacent to said data entry work station for sliding under a front section of said keyboard or mouse without disturbing the positioning of said keyboard or mouse, and the bottom surface of said foot pad contains a self-lubricating slick material;

a hand cradle for supporting a body part of the user, said hand cradle being mountable on said upper end of said tower thereby allowing the user to slideably move the ergonomic support;

a glide board having a top surface adapted to be mountable under the keyboard and mouse device, wherein the top surface engages with said bottom surface of said foot pad to provide sliding motion of said pad over said glide board; and, a mouse support for raising the mouse device to a height compatible with said keyboard whereby the user may slide a support from said keyboard to said mouse.

2. The ergonomic support defined in claim 1 wherein said tower allows slight twisting to accommodate slight movement of said hand cradle without repositioning said foot pad.

3. The ergonomic support defined in claim 1 further comprising a kickplate which accommodates said toe element of said foot pad for sliding said hand cradle over a front edge of said mouse support.

4. The ergonomic support defined in claim 1 further comprising a hook and loop fastener mat mounted on said glide board.

5. The ergonomic support defined in claim 1 wherein the top surface of the hand cradle is adapted to caress a group of body parts consisting of a forearm, hand, wist and palm of the user.

6. The ergonomic support defined in claim 5 further comprising a soft, padded non-skid material mounted on the top surface of said hand cradle.

* * * * *